United States Patent
Chien et al.

(10) Patent No.: US 8,393,739 B2
(45) Date of Patent: Mar. 12, 2013

(54) HEAT-DISSIPATING DEVICE WITH SHAPE MEMORY ALLOY MODULE WITHIN A PROJECTION DISPLAY APPARATUS

(75) Inventors: Chao-Nan Chien, Hsinchu (TW);
Wei-Cheng Lo, Hsinchu (TW);
Nien-Hui Hsu, Hsinchu (TW)

(73) Assignee: Coretronic Corporation, Hsinchu (TW)

( * ) Notice: Subject to any disclaimer, the term of this patent is extended or adjusted under 35 U.S.C. 154(b) by 434 days.

(21) Appl. No.: 12/482,993

(22) Filed: Jun. 11, 2009

(65) Prior Publication Data
US 2010/0007859 A1 Jan. 14, 2010

(30) Foreign Application Priority Data

Jul. 11, 2008 (TW) ................................ 97126229 A

(51) Int. Cl.
*G03B 21/16* (2006.01)
*F21V 29/00* (2006.01)
(52) U.S. Cl. ......................................... 353/61; 362/294
(58) Field of Classification Search ............... 353/52–61, 353/119, 122; 454/184–186; 362/231, 547, 362/218, 294, 373; 348/743, 748, 744; 250/208.1, 250/239, 238, 231.1; 352/198, 202
See application file for complete search history.

(56) References Cited

U.S. PATENT DOCUMENTS

| | | | | |
|---|---|---|---|---|
| 4,513,358 | A | * | 4/1985 | Lemme .......................... 362/276 |
| 5,107,085 | A | * | 4/1992 | Roswold ........................ 200/531 |
| 5,860,719 | A | | 1/1999 | Suzuki et al. |
| 6,254,238 | B1 | | 7/2001 | Takamatsu |
| 6,955,434 | B2 | * | 10/2005 | Hsu ................................ 353/61 |
| 6,991,280 | B2 | * | 1/2006 | McKnight et al. .......... 296/180.1 |
| 7,040,490 | B2 | | 5/2006 | Jerg |
| 2004/0212784 | A1 | | 10/2004 | Hsu |
| 2005/0121946 | A1 | | 6/2005 | McKnight et al. |
| 2007/0013874 | A1 | | 1/2007 | Lee et al. |
| 2007/0190926 | A1 | | 8/2007 | Lu et al. |
| 2008/0018257 | A1 | | 1/2008 | Beasley |

FOREIGN PATENT DOCUMENTS

| | | |
|---|---|---|
| EP | 0107900 A1 | 5/1984 |
| JP | 2006119288 | 5/2006 |
| JP | 2007241002 A | 9/2007 |
| WO | WO-02/31593 A1 | 4/2002 |
| WO | WO-2006/104302 A1 | 10/2006 |

* cited by examiner

*Primary Examiner* — Que T Le
*Assistant Examiner* — Jennifer Bennett
(74) *Attorney, Agent, or Firm* — Muncy, Geissler, Olds & Lowe, PLLC

(57) ABSTRACT

A heat-dissipating device used in a projection display apparatus with an air outlet includes a fence module, at least one resilient member, and a shape memory alloy module. The fence module is disposed at the air outlet and includes at least one guiding plate with a pivot. The resilient member exerts a first force on the guiding plate to enable the guiding plate to rotate on the pivot, and the shape memory alloy module deforms when heated to exert a second force on the guiding plate to enable the guiding plate to rotate on the pivot.

15 Claims, 5 Drawing Sheets

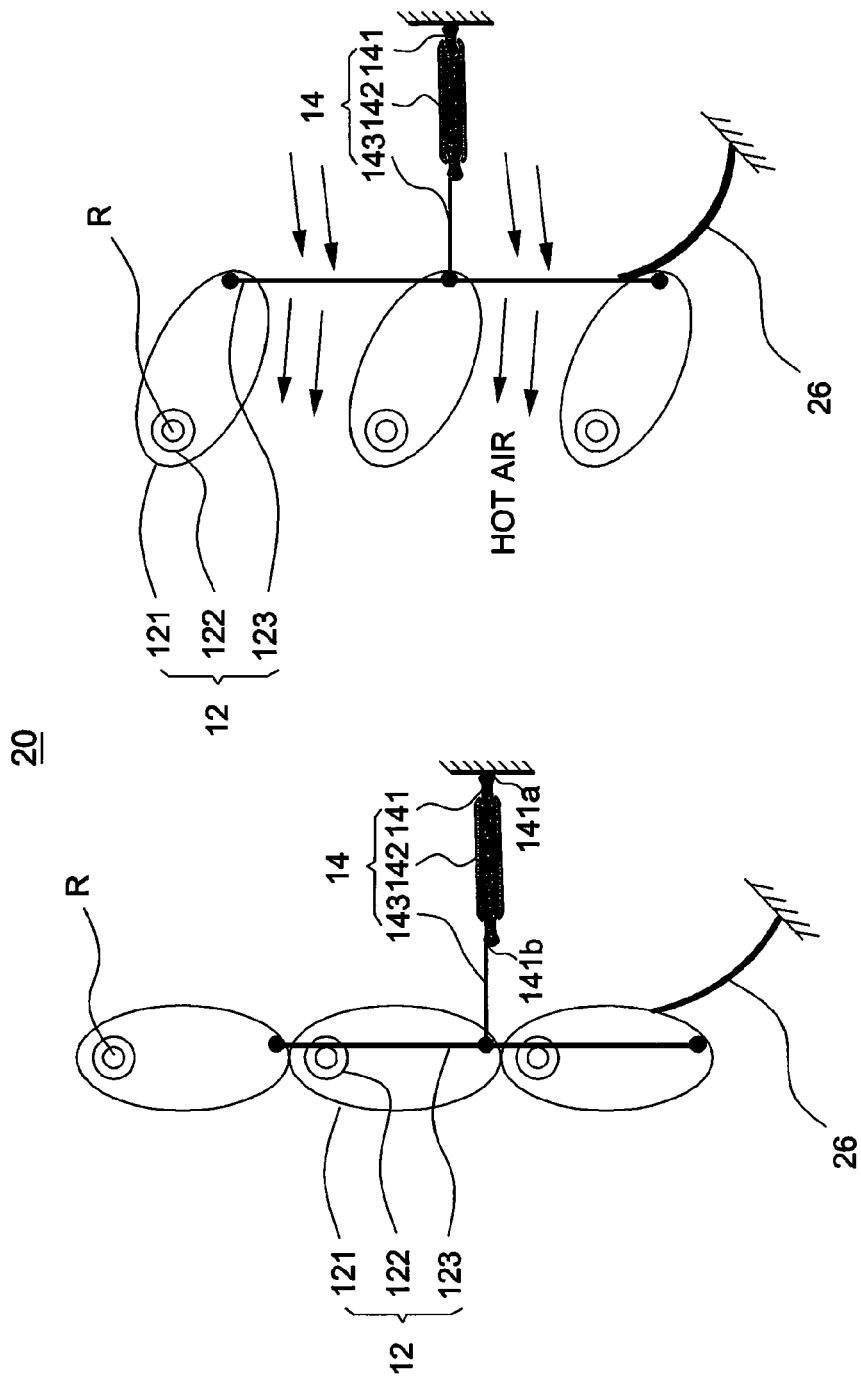

HEAT-DISSIPATING DEVICE WITH SHAPE MEMORY ALLOY MODULE WITHIN A PROJECTION DISPLAY APPARATUS

CROSS REFERENCE TO RELATED APPLICATION

This application claims priority of application No. 097126229 filed in Taiwan R.O.C on Jul. 11, 2008 under 35 U.S.C. §119; the entire contents of which are hereby incorporated by reference.

BACKGROUND OF THE INVENTION

1. Field of the Invention

The invention relates to a heat-dissipating device, and particularly to a heat-dissipating device adapted to a projection display apparatus with an air outlet.

2. Description of the Related Art

FIG. 1 shows a schematic diagram illustrating a partial structure of a conventional projection display apparatus. Referring to FIG. 1, the projection display apparatus 100 uses a high-power lamp 102 as a light source. Since the high-power lamp 102 generates considerable heat during operation, a fan 104 is disposed near the lamp 102 to induce a forced convection of air, and the flow W flows through the lamp 102 and leaves by an air outlet WP to cool down the lamp 102. As shown in FIG. 1, a fixed louvered fence 106 also constituting part of a housing of the projection display apparatus 100 is disposed at the air outlet WP. The fixed louvered fence 106 includes multiple guiding plates 108 parallel to each other, and the flow W comes out of the projection display apparatus 100 via each opening formed between two adjacent guiding plates 108. The guiding plates 108 are properly inclined to block out dazzle of the high-power lamp 102 and disturbed heat flows to maintain high projection quality. However, since the size of an opening formed between two adjacent immobile guiding plates 108 is not adjustable, containments such as dust are liable to enter the inside of the projection display apparatus to reduce the operation life and the projection performance. Besides, the fixed size of each opening results in unchanged flow resistance, and the flow resistance is not further reduced. In that case, the fan speed is forced to increase greatly under high-temperature circumstances to create a lot of noises and increase power dissipation.

BRIEF SUMMARY OF THE INVENTION

The invention provides a heat-dissipating device used in a projection display apparatus capable of overcoming disadvantages of conventional designs and is simplified in operation.

According to an embodiment of the invention, a heat-dissipating device used in a projection display apparatus with an air outlet includes a fence module, at least one resilient member, and a shape memory alloy module. The fence module is disposed at the air outlet and includes at least one guiding plate with a pivot. The resilient member exerts a first force on the guiding plate to enable the guiding plate to rotate on the pivot, and the shape memory alloy module deforms when heated to exert a second force on the guiding plate to enable the guiding plate to rotate on the pivot.

According to another embodiment of the invention, a projection display apparatus includes a light source for emitting a light beam, an optical engine, a fan, and a heat-dissipating device. The optical engine is used for receiving and modulating the light beam to project a display image, and the fan is used for inducing a forced convection of air to cool down the light source. The heat-dissipating device includes a fence module, at least one resilient member, and a shape memory alloy module. The fence module is disposed at an air outlet and includes at least one guiding plate with a pivot. The resilient member exerts a first force on the guiding plate to enable the guiding plate to rotate around the pivot, and the shape memory alloy module deforms when heated to exert a second force on the guiding plate to enable the guiding plate to rotate around the pivot.

In one embodiment, the fence module includes a plurality of guiding plates and a plurality of axles corresponding to the guiding plates respectively, each of the axles pivots on the pivot of each of the guiding plates correspondingly, and a lever links the guiding plates, the resilient member, and the shape memory alloy module.

In one embodiment, the fence module includes a plurality of guiding plates, the resilient members are plural and disposed corresponding to the guiding plates respectively, and the shape memory alloy module includes a plurality of shape memory alloy elements disposed corresponding to the guiding plates respectively. Besides, the guiding plate has a first force exertion point and a second force exertion point, the resilient member exerts the first force on the guiding plate via the first force exertion point, and the shape memory alloy element exerts the second force on the guiding plate via the second force exertion point. Each of the guiding plates rotates on the pivot as a result of the forces exerted by its corresponding resilient member and shape memory alloy elements on the guiding plates.

In one embodiment, the shape memory alloy module includes a shape memory alloy element, a metal housing for surrounding the shape memory alloy element to facilitate uniform heat distribution, and a connecting member. One end of the connecting member is connected to the shape memory alloy element and the other end of the connecting member is connected to the lever. The shape memory alloy element is in the shape of a spiral, and the material of the shape memory alloy module includes nitinol.

According to the above embodiments, when the projection display apparatus is not in use, the fence module under normal temperature is close to keep out containments such as dust or insects and to ensure a clean inside of the apparatus and high projection quality. Besides, when the projection display apparatus is turned on, the fence module is open as a result of raised temperature to achieve heat dissipation. Then, as the temperature continually increases, the recovery force of the shape memory alloy element is also gradually increased to shift the lever toward the right side to a greater extent and thus enlarge the opening. Hence, the fence module has an excellent performance of heat dissipation since the degree of dissipating heat is also adjustable according to the variation of surrounding temperature. In addition, the heat-dissipation mechanism that incorporates the use of a shape memory alloy element according to this embodiment permits a simplified operation and control and reduced component costs.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

FIGS. 3A and 3B shows a heat-dissipating device according to another embodiment of the invention, where the heat-dissipating device operates under distinct heating conditions respectively shown in FIG. 3A and FIG. 3B.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
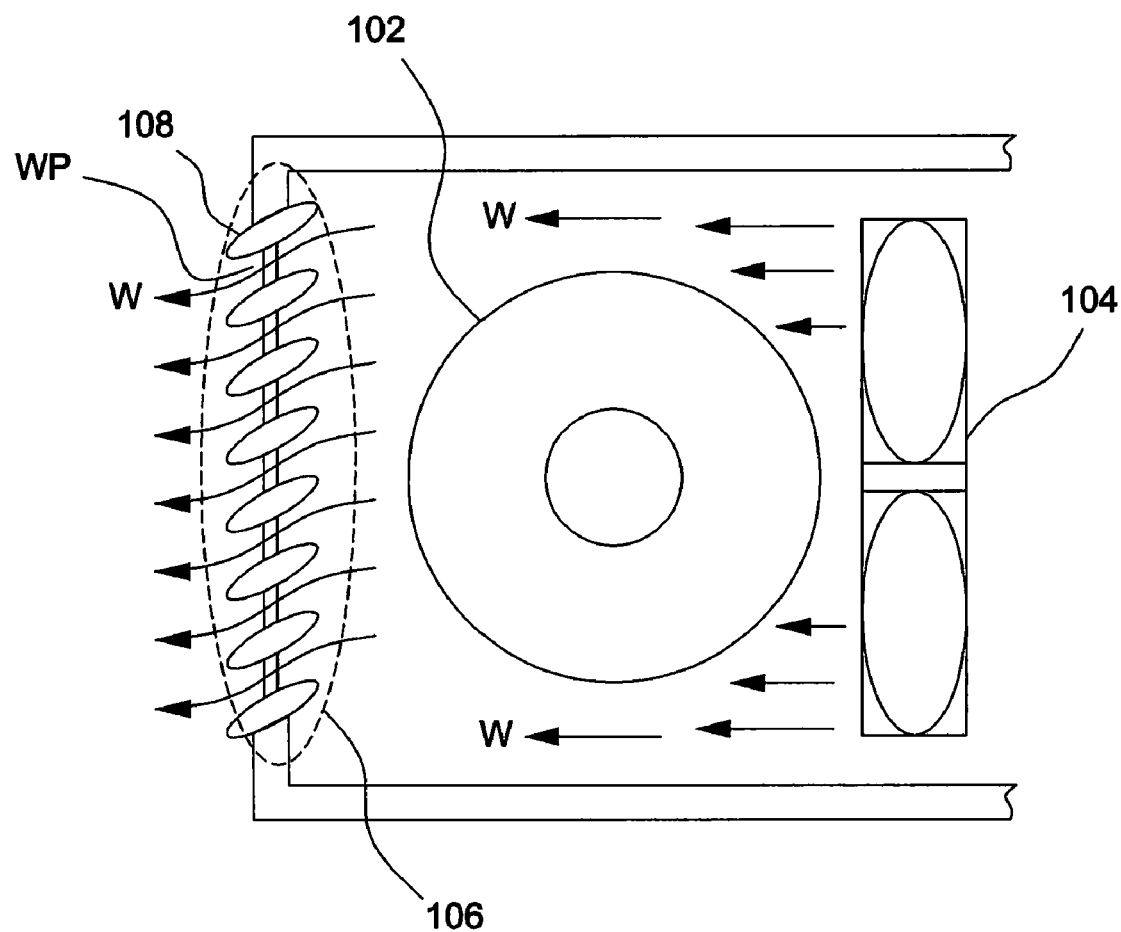
FIG. 1 shows a schematic diagram illustrating a partial structure of a conventional projection display apparatus.
Figures 2A, 2B:
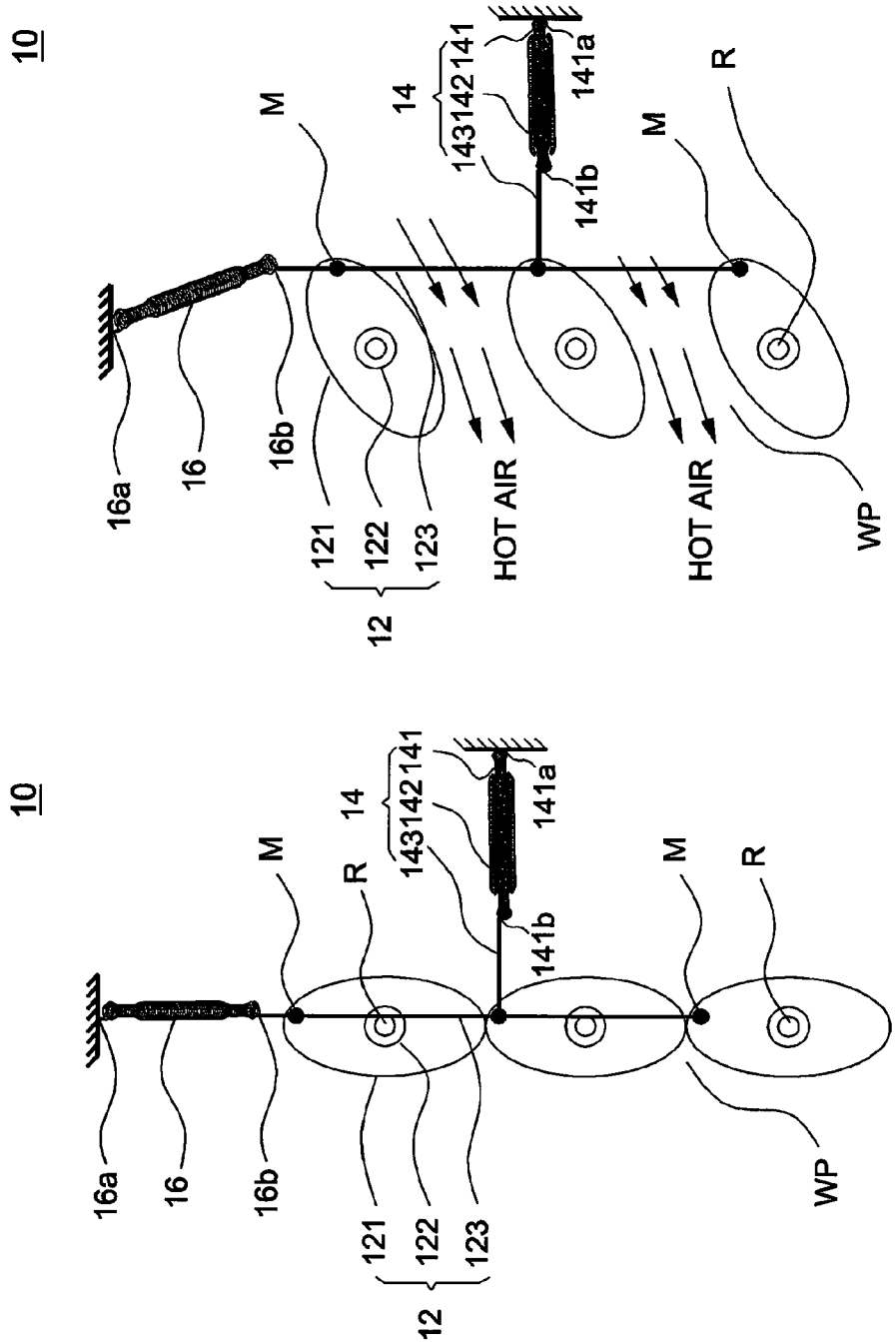
FIGS. 2A and 2B are schematic diagrams illustrating a heat-dissipating device according to an embodiment of the invention, where the heat-dissipating device operates under distinct heating conditions respectively shown in FIG. 2A and FIG. 2B.

FIGS. 2A and 2B are schematic diagrams illustrating a heat-dissipating device 10 according to an embodiment of the invention, where the heat-dissipating device 10 operates under distinct heating conditions respectively shown in FIG. 2A and FIG. 2B. In this embodiment, the heat-dissipating device 10 is used in a projection display apparatus with an air outlet WP and includes a fence module 12, a shape memory alloy (SMA) module 14, and at least one resilient member 16. The fence module 12 is disposed at the air outlet WP and includes multiple guiding plates 121, multiple axles 122 corresponding to the guiding plates 121, and a lever 123 linking each of the guiding plates 121. Each of the guiding plates 121 rotates on its pivot point R, and each of the axles 122 pivots on the pivot point R of each of the guiding plates 121 correspondingly. Since the lever 123 links each of the guiding plates 121 through respective connection point M, a moving lever 123 forces each guiding plate 121 to rotate in a first direction on its pivot point R of each the guiding plate 121. One end of the resilient member 16 (fixed end 16a) is fixed and the other end of the resilient member 16 (free end 16b) is in contact with the lever 123. In one embodiment, the resilient member 16 is a spring. The shape memory alloy module 14 includes a shape memory alloy element 141, a metal housing 142, and a connecting member 143. The metal housing 142 surrounds the shape memory alloy element 141 to facilitate uniform heat distribution, and the connecting member 143 connects the shape memory alloy element 141 with the lever 123. One end of the shape memory alloy element 141 (fixed end 141a) is fixed, the other end of the shape memory alloy element 141 (free end 141b) is connected to the connecting member 143, and one end of the connecting member 143 is connected to the lever 123. The shape memory alloy is allowed to deform to any shape under normal temperature when external forces exert thereon, and the shape memory alloy recovers to the original shape when heated. In this embodiment, the shape memory alloy element 141 is in the shape of a spiral (like a spring), so the shape memory alloy element 141 stretches when imposed by external forces under normal temperature and recovers to the original shape when heated. Further, the material of the shape memory alloy element 141 includes, but is not limited to, nitinol composed of nickel and titanium. The nitinol has excellent quality of anti-fatigue and anti-corrosion and is endurable with considerable large tension and pressure. In an alternate embodiment, the shape memory alloy module 14 may include only a shape memory alloy element 141, but this is not limited.

As shown in FIG. 2A, when the resilient member 16 pulls the lever 123 under normal temperature, the elastic force of the resilient member 16 exerted on each guiding plate 121 through a connection point M enables each guiding plate 121 to rotate around the pivot point R of each guiding plate 121 (the point on which an axle pivots), with each guiding plate 121 being connected with the lever 123 via the connection point M. Since the shape memory alloy element 141 may be in any shape under normal temperature (stretched as shown in FIG. 2A), the elastic force of the resilient member 16 is larger than the resistance force of the shape memory alloy element 141 so that each guiding plate 121 is pulled to a position shown in FIG. 2A, where the guiding plates 121 are in contact with each other without a gap formed between the guiding plates 121. In other words, the fence module 12 is in a close state. Then, as shown in FIG. 2B, when the projection display apparatus is turned on, operation of the projection display apparatus causes high-temperature to heat the shape memory alloy element 141. In that case, the heated shape memory alloy element 141 recovers to the original shape (shortened), and the recovery force of the shape memory alloy element 141 caused by deformation is larger than the elastic force of the resilient member 16 exerted on the guiding plates 121 to pull the lever 123 toward the right side. Hence, the moving lever 123 forces each guiding plate 121 to clockwise rotate around the pivot point R of each guiding plate 121 for a certain angle to open the fence module 12, and thus heated air comes out via each opening between two guiding plates 121 to achieve the effect of heat dissipation.

Hence, according to this embodiment, when the projection display apparatus is not in use, the fence module 12 under normal temperature is close to keep out containments such as dust or insects and to ensure a clean inside of the apparatus and high projection quality. Besides, when the projection display apparatus is turned on, the fence module 12 is open as a result of raised temperature to achieve heat dissipation. Then, as the temperature continually increases, the recovery force of the shape memory alloy element 141 is also gradually increased to shift the lever 123 toward the right side to a greater extent and thus enlarge the opening between the guiding plates 121. Hence, the fence module 12 has an excellent performance of heat dissipation since the degree of dissipating heat is also adjustable according to the variation of surrounding temperature. In addition, the heat-dissipation mechanism of the use of a shape memory alloy element 141 according to this embodiment permits a simplified operation and control and reduced component costs.

FIGS. 3A and 3B shows a heat-dissipating device 20 according to another embodiment of the invention, where the heat-dissipating device 20 operates under distinct heating conditions respectively shown in FIG. 3A and FIG. 3B. This embodiment is similar to the above embodiment, except the resilient member 26 is a resilient sheet. As shown in FIG. 3A, one end of the resilient sheet is fixed and the elastic force of the resilient sheet is imposed on a guiding plate 121 through the other end of the resilient sheet that is in contact with the guiding plate 121. Hence, the resilient sheets together with the linkage of the lever 123 permit a close state of the fence module 12. Referring to FIG. 3B, when the projection display apparatus is turned on, operation of the projection display apparatus causes high-temperature to heat the shape memory alloy element 141. In that case, the heated shape memory alloy element 141 recovers to the original shape (shortened), and recovery force of the shape memory alloy element 141 is larger than the elastic force of the resilient sheet exerted on the guiding plate 121 to pull the lever 123 toward the right side to open the fence module 12. As a result, heated air is also allowed to come out via each opening between two guiding plates 121 to achieve the effect of heat dissipation.

Figure 4B:
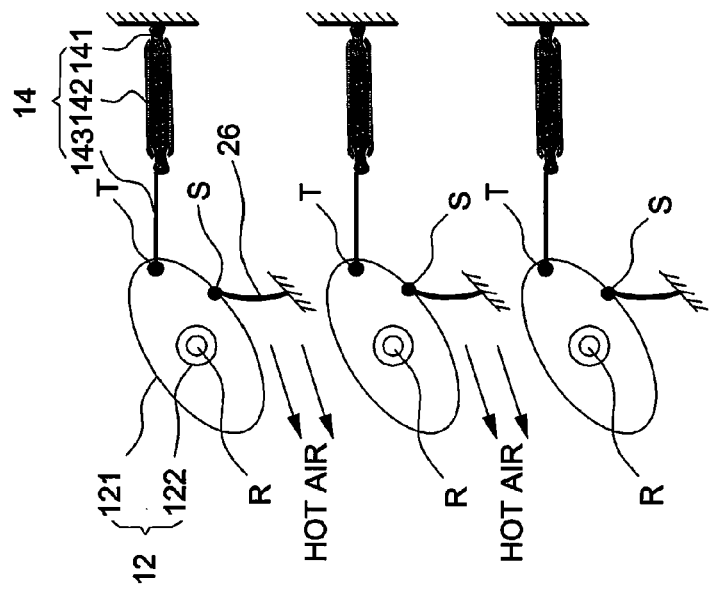
FIGS. 4A and 4B are schematic diagrams illustrating a heat-dissipating device according to another embodiment of the invention, where the heat-dissipating device operates under distinct heating conditions respectively shown in FIG. 4A and FIG. 4B.
Figure 4A:
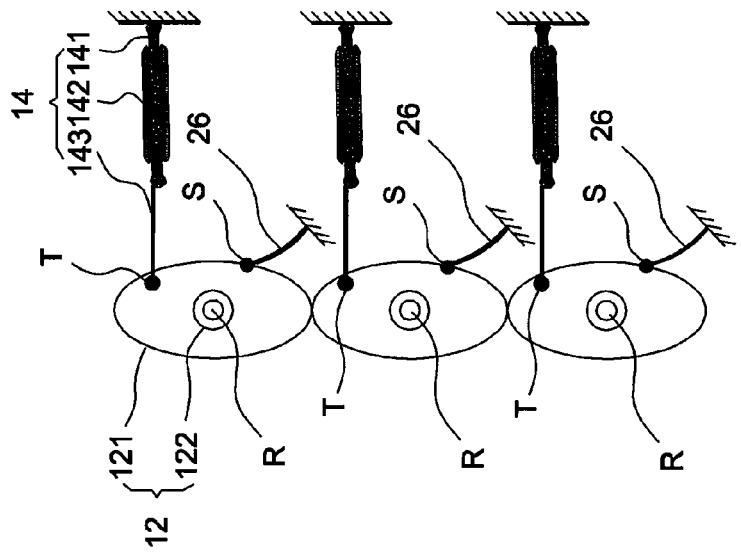

FIGS. 4A and 4B are schematic diagrams illustrating a heat-dissipating device 30 according to another embodiment of the invention. In this embodiment, each of the guiding plates 121 is corresponding to a resilient member 26 and a shape memory alloy module 14, and the lever 123 linking the guiding plates 121 shown in the above embodiments is omitted here. Hence, each guiding plate 121 is allowed to rotate on its pivot point of each guiding plate 121 as a result of the forces exerted by the corresponding resilient member 26 and shape memory alloy element 141. Specifically, as shown in FIGS. 4A and 4B, each guiding plate 121 has a pivot point R, a first force exertion point S, and a second force exertion point T. The resilient member 26 exerts a force on the guiding plate 121 via the first force exertion point S, and the shape memory alloy element 141 exerts a force on the guiding plate 121 via the second force exertion point T. Therefore, the position of each guiding plate is allowed to be adjusted to open (FIG. 4B) or close (FIG. 4A) the fence module 12.

Figure 5:
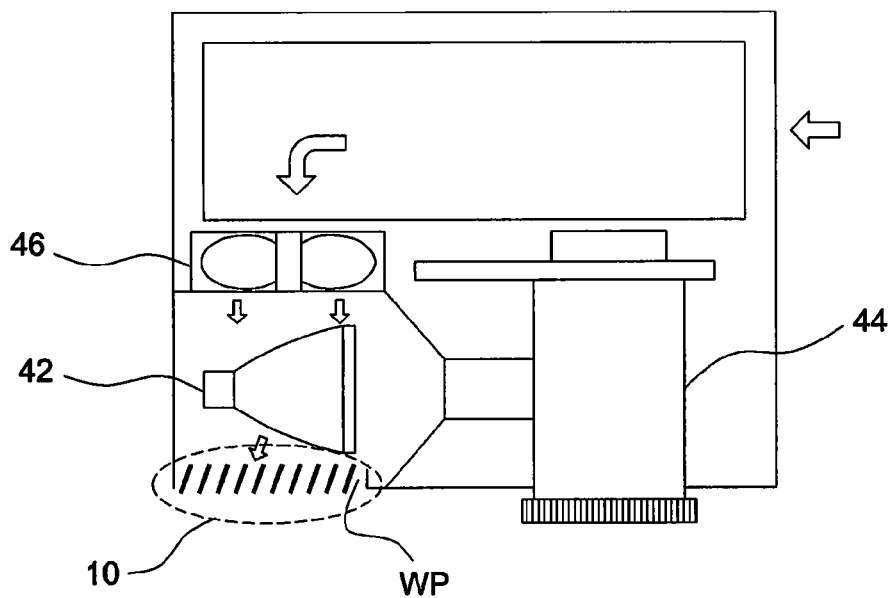
FIGS. 5 and 6 show schematic diagrams illustrating the layout of a heat-dissipating device in a projection display apparatus, where a projection display apparatus without a wind channel is shown in FIG. 5, and a projection display apparatus with a wind channel is shown in FIG. 6.
Figure 6:
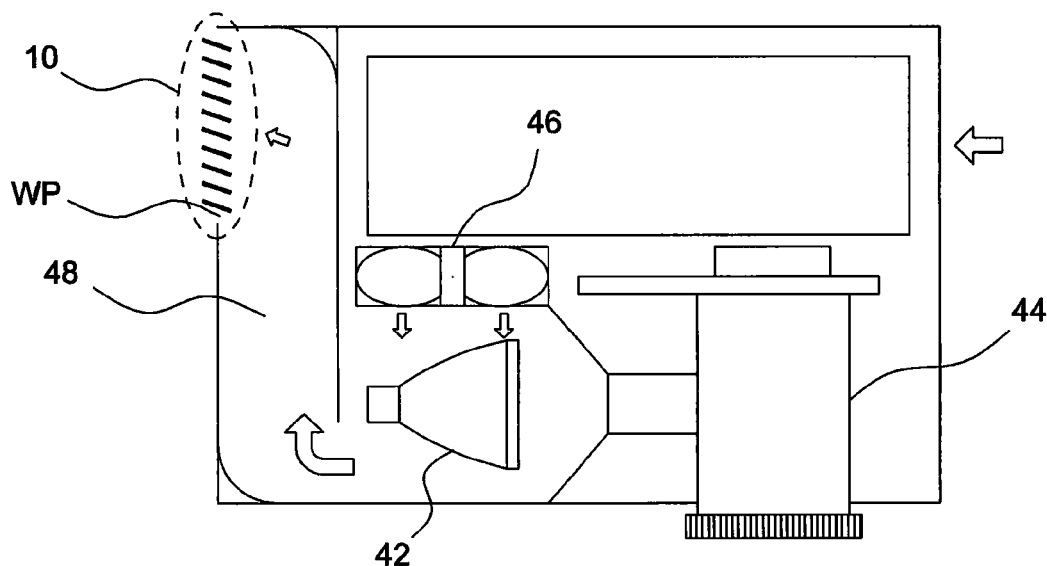

FIGS. 5 and 6 show schematic diagrams illustrating the layout of a heat-dissipating device in a projection display apparatus, where a projection display apparatus 40 without a wind channel is shown in FIG. 5, a projection display apparatus 50 with a wind channel is shown in FIG. 6, and the arrows in FIG. 5 and FIG. 6 indicate flow directions of air. As shown in FIG. 5, the emitting light of a light source 42 is received and then modulated by an optical engine 44 to project a display image, and a fan 46 induces a forced convection of air to cool down the light source 42, with the cooling air flowing through the light source 42 and leaving by the air outlet WP. The guiding plates of the heat-dissipating device 10 are tightly connected with the air outlet WP. Hence, when the projection display apparatus 40 is not in use, the guiding plates of the heat-dissipating device 10 are close to seal the air outlet WP to avoid the entrance of containments, keep the inside of the apparatus clean, and maintain competent projection quality. When the projection display apparatus 40 is turned on, the deformation of a shape memory alloy allows to open the guiding plates and thus discharge hot air via each opening between two adjacent guiding plates. Further, as shown in FIG. 6, a wind channel 48 may be disposed between the air outlet WP and the light source 42 in the projection display apparatus 50, and the heat-dissipating device 10 is tightly connected with the air outlet WP.

Note though the guiding plates 121 are exemplified as plural, this is not limited. The same effect of the above embodiments is also achieved even the fence module 12 has only one guiding plate 121.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A heat-dissipating device used in a projection display apparatus with an air outlet, comprising:
a fence module disposed at the air outlet, the fence module comprising a plurality of guiding plates, a plurality of axles corresponding to the guiding plates respectively, and a lever, and each of the axles pivots on a pivot of each of the guiding plates correspondingly;

at least one resilient member exerting a first force on each of the guiding plates to enable each of the guiding plates to rotate on the pivot; and a shape memory alloy module capable of exerting a second force on each of the guiding plates to enable each of the guiding plates to rotate on the pivot, wherein the shape memory alloy module deforms to any shape under normal temperature when external forces exert thereon and recovers to the original shape when heated as a result of high-temperature caused by the operation of the projection display apparatus, and wherein the lever connected with the guiding plates, the resilient member, and the shape memory alloy module.

2. The heat-dissipating device as claimed in claim 1, wherein the second force generated as a result of the deformation of the shape memory alloy module and exerted on each of the guiding plates is larger than the first force of the resilient member exerted on each of the guiding plates.

3. The heat-dissipating device as claimed in claim 1, wherein the resilient member comprises a resilient sheet.

4. The heat-dissipating device as claimed in claim 3, wherein one end of the resilient sheet is fixed and the other end of the resilient sheet is in contact with at least one of the guiding plates.

5. The heat-dissipating device as claimed in claim 1, wherein the resilient member comprises a spring.

6. The heat-dissipating device as claimed in claim 5, wherein one end of the spring is fixed and the other end of the spring is in contact with the lever.

7. The heat-dissipating device as claimed in claim 1, wherein the shape memory alloy module comprises a shape memory alloy element.

8. The heat-dissipating device as claimed in claim 7, wherein the shape memory alloy element is in the shape of a spiral.

9. The heat-dissipating device as claimed in claim 7, wherein the shape memory alloy module further comprises a connecting member, one end of the connecting member is connected to the shape memory alloy element, and the other end of the connecting member is connected to the lever.

10. The heat-dissipating device as claimed in claim 7, wherein the shape memory alloy module further comprises a metal housing, and the metal housing surrounds the shape memory alloy element to facilitate uniform heat distribution.

11. The heat-dissipating device as claimed in claim 1, wherein the fence module comprises a plurality of slats, the resilient members are plural and corresponding to the slats, the shape memory alloy module comprises a plurality of shape memory alloy elements disposed corresponding to the guiding plates respectively, and each of the guiding plates rotates on the pivot as a result of the forces exerted by the resilient member and the shape memory alloy element on the guiding plates.

12. The heat-dissipating device as claimed in claim 11, wherein each of the guiding plates further has a first force exertion point and a second force exertion point, the resilient member exerting the first force on each of the guiding plates via the first force exertion point, and the shape memory alloy element exerting the second force on each of the guiding plates via the second force exertion point.

13. The heat-dissipating device as claimed in claim 1, wherein the material of the shape memory alloy module comprises nitinol.

14. A projection display apparatus, comprising:
a light source for emitting a light beam;
an optical engine for receiving and modulating the light beam to project a display image;
a fan for inducing a forced convection of air to cool down the light source; and
a heat-dissipating device, comprising:
a fence module disposed at an air outlet of the projection display apparatus, and the fence module comprising a plurality of guiding plates, a plurality of axles corresponding to the guiding plates respectively, and a lever, and each of the axles pivots on a pivot of each of the guiding plates correspondingly;
a resilient member exerting a first force on each of the guiding plates to enable each of the guiding plates to rotate on the pivot; and
a shape memory alloy module capable of exerting a second force on each of the guiding plates to enable each of the guiding plates to rotate on the pivot, wherein the shape memory alloy module deforms to any shape under normal temperature when external forces exert thereon and recovers to the original shape when heated as a result of high-temperature caused by the operation of the projection display apparatus, and wherein the lever connected with the guiding plates, the resilient member, and the shape memory alloy module.

15. The projection display apparatus as claimed in claim 14, further comprising a wind channel disposed between the air outlet and the light source.

* * * * *